United States Patent [19]

Ishii et al.

[11] Patent Number: 4,788,000

[45] Date of Patent: * Nov. 29, 1988

[54] LIQUID-CRYSTAL COMPOSITION

[75] Inventors: Yutaka Ishii, Nara; Fumiaki Funada, Yamatokoriyama; Masataka Matsuura, Tenri, all of Japan

[73] Assignees: Sharp Kabushiki Kaisha, Osaka, Japan; Merck Patent Gesellschaft met beschrankter haftung, Darmstadt, Fed. Rep. of Germany

[ * ] Notice: The portion of the term of this patent subsequent to Feb. 17, 2004 has been disclaimed.

[21] Appl. No.: 896,502

[22] Filed: Aug. 15, 1986

Related U.S. Application Data

[63] Continuation-in-part of Ser. No. 642,775, Aug. 21, 1984, Pat. No. 4,643,841, and a continuation-in-part of Ser. No. 834,357, Feb. 28, 1986, Pat. No. 4,722,804, which is a continuation of Ser. No. 614,013, May 25, 1984, abandoned.

[30] Foreign Application Priority Data

May 26, 1983 [JP] Japan ................................. 58-93812
Aug. 30, 1983 [JP] Japan ................................. 58-158510

[51] Int. Cl.$^4$ ........................ G02F 1/13; C09K 19/34
[52] U.S. Cl. ........................... 252/299.61; 252/299.5; 252/299.63; 252/299.66
[58] Field of Search ........... 252/299.5, 299.61, 299.63, 252/299.66; 350/350 R

[56] References Cited

U.S. PATENT DOCUMENTS

| | | | |
|---|---|---|---|
| 3,947,375 | 3/1976 | Gray et al. | 252/299.66 |
| 4,137,192 | 1/1979 | Matsufuji et al. | 252/299.63 |
| 4,180,475 | 12/1979 | Schadt et al. | 252/299.5 |
| 4,372,871 | 2/1983 | Toriyama et al. | 252/299.63 |
| 4,391,730 | 7/1983 | Kuschel et al. | 252/299.61 |
| 4,564,694 | 1/1986 | Hirai et al. | 252/299.63 |
| 4,643,841 | 2/1987 | Ishii et al. | 252/299.61 |
| 4,722,804 | 2/1988 | Ishii et al. | 252/299.61 |

FOREIGN PATENT DOCUMENTS

| | | | |
|---|---|---|---|
| 137210 | 4/1985 | European Pat. Off. | 252/299.61 |
| 151446 | 8/1985 | European Pat. Off. | 252/299.61 |
| 2257588 | 6/1973 | Fed. Rep. of Germany | 252/299.61 |
| 54-43189 | 4/1979 | Japan | 252/299.61 |
| 54-41285 | 4/1979 | Japan | 252/299.61 |
| 55-152777 | 11/1980 | Japan | 252/299.61 |
| 59-184166 | 10/1984 | Japan | 252/299.61 |
| 59-221377 | 12/1984 | Japan | 252/299.61 |
| 60-51778 | 2/1985 | Japan | 252/299.61 |
| 60-184587 | 9/1985 | Japan | 252/299.61 |
| 60-168783 | 9/1985 | Japan | 252/299.61 |
| 61-62590 | 3/1986 | Japan | 252/299.61 |
| 2067586 | 7/1981 | United Kingdom | 252/299.61 |
| 2142647 | 1/1985 | United Kingdom | 252/299.61 |

*Primary Examiner*—Teddy S. Gron
*Attorney, Agent, or Firm*—Birch, Stewart, Kolasch & Birch

[57] ABSTRACT

A liquid-crystal composition to be used in a multiplex-driving system in a twisted nematic (TN) type liquid-crystal display devices is extremely superior in its display characteristics, and is able to meet sufficiently the demands to increase the information content of various liquid-crystal display devices of high-level multiplexing operation. The liquid-crystal composition is more considerable in its usefulness than the validity thereof in half-tone display especially when it is used in a liquid-crystal television.

The liquid crystal composition having a positive dielectric anisotropy in the nematic phase, comprises each 3 wt % or more of 2-(4-alkoxyphenyl)-5-alkylpyrimidine compound and of a cyanobiphenyl compound.

20 Claims, 3 Drawing Sheets

LIQUID-CRYSTAL COMPOSITION

This application is a continuation-in-part application in connection with U.S. patent application Ser. No. 642,775, filed on Aug. 21, 1984, now U.S. Pat. No. 4,643,841, and U.S. patent application Ser. No. 834,357 filed on Feb. 28, 1986, now U.S. Pat. No. 4,722,804, both in the names of Yutaka ISHII, Fumiaki FUNADA and Masataka MATSUURA. U.S. patent application Ser. No. 834,357 filed on Feb. 28, 1986 is a continuation application of U.S. patent application Ser. No. 614,013 filed on May 25, 1984 and now abandoned.

BACKGROUND OF THE INVENTION

1. Field of the Invention

The present invention relates to a liquid crystal composition, and more particularly to a liquid crystal composition suitable for liquid crystal display devices of the twisted nematic mode in which a multiplex drive scheme is employed.

2. Description of the Prior Art

Recently, the enlargement of the information content of a display device has been needed in the field of liquid crystal display devices. Liquid crystal display devices of the matrix display type are being supplied more and more because they are more appropriate for the enlargement of the information content than liquid crystal display devices of the segment display scheme which have previously been used. The increase in the number N of multiplexed lines of the multiplex drive in the matrix display scheme is also demanded in order to develop the diversification of the display further. In the matrix display, the multiplexity (N) in the multiplex driving is desired to be increased to 32, 64, or more so as to further diversify the information content.

The drive of a liquid-crystal of X-Y matrix type by the optimized amplitude-selecting method of the multiplexity and the ratio $\alpha$ of the effective voltage Vrms (on) in the selected picture-element to the effective voltage Vrms (off) in the non-selected picture-element is given as well known by the following formula:

$$\alpha = \frac{Vrms(\text{on})}{Vrms(\text{off})} = \sqrt{\frac{\sqrt{N}+1}{\sqrt{N}-1}}.$$

When the N is $\infty$ in the formula, the $\alpha$ value becomes 1. As apparent from this formula, the ratio of the Vrms (off) to the Vrms (on) should be smaller as the multiplexity N increases. Accordingly, the matrix type liquid-crystal display devices of a high information content require a liquid-crystal material of sharp threshold characteristics, i.e., of superior contrast ratio provided by the small voltage ratio. The threshold characteristics of the conventional liquid-crystal material were not good enough that problems such as a low display contrast, narrow effective viewing-angle range, etc. were caused under the matrix driving operation of the liquid-crystal panel wherein the N became a large value of 32 or higher.

SUMMARY OF THE INVENTION

Accordingly, an object of the present invention is to provide a new liquid crystal composition appropriate for the multiplex drive scheme especially with a high number of multiplexed lines.

In order to accomplish this and other objects of the present invention, a primary composition, which is suitable for the matrix driving operation, is provided.

In accordance with the present invention, a new liquid crystal composition is provided which has a positive dielectric anisotropy in the nematic phase, comprising of each 3 wt% or more of a 2-(4-alkoxyphenyl)-5-alkyl-pyrimidine compound and of a cyanobiphenyl compound.

According to the present invention, there is provided a nematic liquid-crystal composition wherein at least one type or more is selected respectively from a compound group (I) and a compound group (II), and they are simultaneously added to a mixture in a case, where compounds represented by the general formulae

Component (I)

Component (II)

Component (III)

Component (IV)

Component (V)

wherein $R_1$ through $R_8$ represent a straight-chain alkyl group of 1 through 6 in the number of carbon atoms, while $R_3'$ and $R_6'$ represent a straight-chain alkoxy group of 1 through 6 in the number of carbon atoms are the compound group (I), and compounds represented by the general formulae:

Component (VI)

Component (VII)

Component (VIII)

-continued wherein $R_9$ through $R_{22}$ represent a straight-chain alkyl group of 1 through 10 in the number of carbon atoms are the compound group (II), in the mixture, which simultaneously contains 2-(4-alkoxyphenyl)-5-alkylpyrimidines ($R_1 = C_nH_{2n+1}$, $R_2 = C_mH_{2m+1}$, n, m=1 through 12)

and compounds which have cyanobiphenyl moiety.

Other objects and features of the invention may be understood from the following detailed description of an illustrative embodiment of the invention, taken together with the accompanying drawings.

BRIEF DESCRIPTION OF THE DRAWINGS

These and other objects and features of the present invention will be disclosed by the following description taken in conjunction with preferred embodiments thereof with reference to the accompanying drawings, in which.

DETAILED DESCRIPTION OF THE INVENTION

As is well known, to produce sharp threshold characteristics in liquid crystal display devices in the twisted nematic mode, a liquid crystal composition should desirably be composed of materials which have an elastic constant ratio $K_{33}/K_{11}$ as small as possible where $K_{11}$ is the splay elastic constant and $K_{33}$ and the bend elastic constant. From this point of view, attention is directed to 2-(4-alkoxyphenyl)-5-alkylpyrimidine, where $R_1 = C_nH_{2n+1}$, $R_2 = C_mH_{2m+1}$, and n and m are positive integers. The ratios $K_{33}/K_{11}$ of those materials are about 0.6 much smaller than that of materials used in the conventional liquid crystals such as the phenylcyclohexane liquid crystals, biphenyl liquid crystals, cyanopyrimidine liquid crystals, dioxane liquid crystals, ester liquid crystals, etc. The ratios of the materials of the conventional liquid crystals usually fall in the range between 0.9 and 2.0.

Table 1 shows electro-optical characteristics of a pyrimidine mixed liquid crystal (hereinafter referred to as Composition 1 or Comp. 1) whose main component is 2-(4-alkoxyphenyl)-5-alkylpyrimidine where n=4 and m=2 or 4, or n=6 and m=2, 4 or 6. The counterparts of some commercial liquid crystal materials for matrix drive are also shown in Table 1. Among them, ZLI-1701 (Merck) comprises mainly a phenylcyclohexane liquid crystal, E-90 (BDH) ester liquid crystal, and RO-TN-403 (Roche) a biphenyl liquid crystal and a cyanopyrimidine liquid crystal.

TABLE 1

|  | Comp. 1 | ZLI-1701 | E-90 | RO-TN-403 |
| --- | --- | --- | --- | --- |
| $V^{0°}_{90\%}$ (V) | 6.9 | 1.78 | 1.32 | 1.43 |
| $\alpha^{0°}$ | 1.36 | 1.42 | 1.39 | 1.42 |
| $\alpha^{15°}$ | 1.23 | 1.33 | 1.28 | 1.28 |
| $\alpha^{30°}$ | 1.16 | 1.27 | 1.23 | 1.21 |
| $\alpha^{45°}$ | 1.12 | 1.24 | 1.20 | 1.18 |
| $\gamma\,^{15°,\,50\%}_{45°,\,90\%}$ | 1.22 | 1.33 | 1.36 | 1.40 |

Figure 1A:
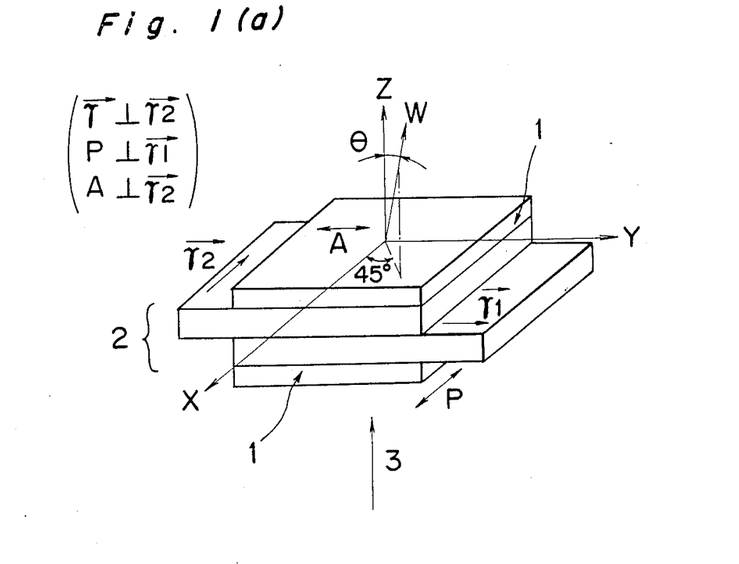
FIG. 1(a) is a perspective view showing the definition of a measuring direction $\theta$, 1, 2, and 3 thereof indicating polarizer, liquid-crystal cell, and incident light, respectively.

FIG. 1(a) displays schematically the structure of a liquid crystal cell and the direction of the measurement of the electro-optical characteristics. A liquid crystal cell 2 contains liquid crystal material, and $\vec{r_1}$ and $\vec{r_2}$ shows the directions of the rubbing on the cell substrate surfaces. Polarizers 1 are attached to the liquid crystal cell, and $\vec{P}$ and $\vec{A}$ are the directions of the polarization axis of the polarizers 1. In FIG. 1(a), the z axis is defined to be perpendicular to the liquid crystal cell 2, while the y axis is defined to lie along the longitudinal direction of the liquid crystal cell and the x axis is defined to be perpendicular to the y and the z axes. The incident light 3 enters perpendicularly in the liquid crystal cell where the voltage V is applied between the liquid crystal material. The direction W along which the transmission of light is measured is changed in a plane which lies in the measuring angle $\theta$ which is defined as an angle between the z axis and W.

Figure 1B:
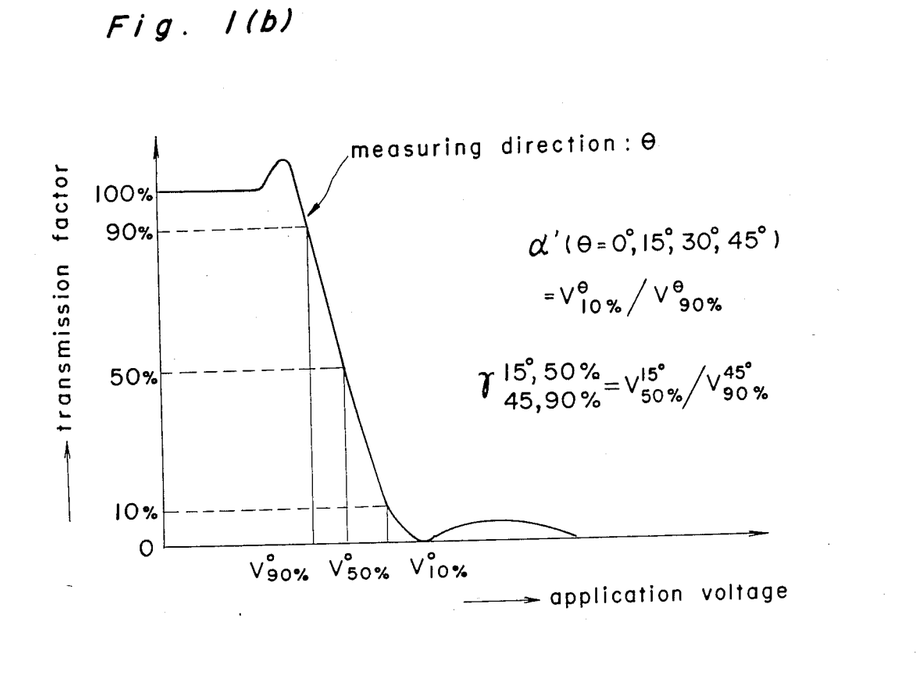
FIG. 1(b) is a graph of the transmission of light plotted against the applied voltage and shows the definition of $$\alpha^\theta(\theta = 0°, 15°, 30°, 45°) \text{ and } \gamma\,^{15°,\,50\%}_{45°,\,90\%};$$

FIG. 1(b) shows the transmission plotted against the applied voltage at constant $\theta$. $V_{Ts}{}^\theta$ denotes the applied voltage at which the transmission Ts is measured at the measuring angle $\theta$. The factor $\alpha^\theta (\theta=0°, 15°, 30°$ or $45°)$ is defined as the ratio $V_{10\%}{}^\theta/V_{90\%}{}^\theta$, while $$\gamma \genfrac{}{}{0pt}{}{15°, 50\%}{45°, 90\%}$$

as the ratio $$V \genfrac{}{}{0pt}{}{15°}{50\%} / V \genfrac{}{}{0pt}{}{45°}{90\%}.$$

$\alpha^\theta$ and $$\gamma \genfrac{}{}{0pt}{}{15°, 50\%}{45°, 90\%}$$

are an evaluation factor of the contrast characteristics and of the viewing angle characteristics, respectively. As is known to those skilled in the art, it is better that both are smaller together. From this standpoint, Composition 1 is superior in contrast characteristics and viewing angle characteristics to the other commercial liquid crystals, as shown in Table 1, and is therefore suitable as a component of a liquid crystal material for matrix displays.

TABLE 2

| No. | Components | $\Delta\epsilon$ |
| --- | --- | --- |
| No. 1 | $C_3H_7$—⟨⟩—COO—⟨⟩—CN | 27 |
|  | $C_5H_{11}$—⟨⟩—COO—⟨⟩—CN |  |
| No. 2 | $C_3H_7$—⟨H⟩—⟨⟩—CN | 15 |
|  | $C_5H_{11}$—⟨H⟩—⟨⟩—CN |  |
| No. 3 | $C_3H_7$—⟨O/O⟩—⟨⟩—CN | 19 |

TABLE 2-continued

| No. | Components | $\Delta\epsilon$ |
| --- | --- | --- |
|  | $C_5H_{11}$—⟨O/O⟩—⟨⟩—CN |  |
| No. 4 | $C_3H_7$—⟨H⟩—COO—⟨⟩—CN | 21 |
|  | $C_5H_{11}$—⟨H⟩—COO—⟨⟩—CN |  |
| No. 5 | $C_3H_7$—⟨⟩—⟨⟩—CN | 16 |
|  | $C_5H_{11}$—⟨⟩—⟨⟩—CN |  |

However, the threshold voltage $V_{90\%}{}^{0°}$ of Composition 1 is higher than those of the conventional liquid crystals, as is shown apparently in Table 1, because its dielectric anisotropy $\Delta\epsilon(\iota 1.0)$ is small, where $\Delta\epsilon = \epsilon_\| - \epsilon_\perp$, and $\epsilon_\|$ and $\epsilon_\perp$ is the dielectric constant measured in the direction parallel and perpendicular to the longitudinal axis of the liquid crystal molecule, respectively. The threshold voltage $V_{90\%}{}^{0°}$ of Composition 1 should be lowered substantially in order for Composition 1 to be used practically as a liquid crystal material. Accordingly, it is necessary for Composition 1 to be mixed with liquid crystal compounds having a positive large $\Delta\epsilon$.

The present inventors have tested compounds No. 1 to No. 5 having a large dielectric anisotropy $\Delta\epsilon$, as listed in Table 2, which can be mixed effectively with pyrimidine compounds and can make the dielectric anisotropy $\Delta\epsilon$ of the resultant mixed liquid crystal much larger than 0. They are mixtures of a weight ratio of 1:1 of a compound having a $C_3H_7$ group to that having a $C_5H_{11}$ group. The present inventors added 20 wt% of such a mixture to Composition 1, and measured the threshold voltage, the contrast characteristics and viewing angle characteristics of the resultant mixed liquid crystals.

As is found apparently from the data shown in FIG. 2, the threshold voltage $V_{90\%}{}^{0°}$ of the mixed liquid crystals lowers down below 3 V with the addition of mixtures No. 1 to No. 5. The contrast characteristics $(\alpha^{30°}, \alpha^{45°})$ are good in the order of No. 1 < No. 2 ≅ No. 3 ≦ No. 4 ≦ No. 5, while the viewing angle characteristics $$\left( \gamma \genfrac{}{}{0pt}{}{15°, 50\%}{45°, 90\%} \right)$$

in the order of No. 1 < No. 2 ≅ No. 3 < No. 4 ≅ No. 5, where the quality is expressed by using inequalities and equalities. The present inventors have also tested the following cyanobiphenyl compounds as compounds to be mixed with Composition 1:

Those compounds are found to show good characteristics similar to mixture No. 5 when mixed with Composition 1. In conclusion, cyanobiphenyl compounds are apparently very effective as a component to be mixed with a pyrimidine liquid crystal in order to lower the threshold voltage. Thus, a basic composition according to the present invention comprises a 2-(4-alkoxyphenyl)-5-alkylpyrimidine and a cyanobiphenyl compound.

Mixed liquid crystal compositions to be used practically in liquid crystal display devices can be prepared by mixing a basic composition mentioned above appropriately with phenylcyclohexane compounds or dioxane compounds. They have display characteristics much superior to prior ones, while having a threshold voltage low enough for practical use. The mesomorphic range where they may exist in the liquid crystal state is wide enough for practical use. However, it is to be noted that the amount of a pyrimidine compound and of a cyanobiphenyl compound to be added to Composition 1 should be each 3 wt% or more because otherwise the effect of the addition cannot be observed at all.

To examplify the usefulness of the pyrimidines, the characteristics of another pyrimidine liquid-crystal mixture of which the composition is shown in Table 1' (hereinafter referred to as composition 1') and the characteristics of conventional materials for matrix driving sold on the market are shown for comparison in Table 2'.

The comparison among the liquid-crystal compositions of Table 2', considering the above-described fact, indicates that the composition 1' is extremely superior in characteristics to the other liquid-crystal compositions. Also, this fact agrees with the prediction from the examination results of the above-described elastic constant ratio $K_{33}/K_{11}$. It is confirmed by the above-described results that the 2-(4-alkoxyphenyl)-5-alkylpyrimidines are extremely suitable components constituting matrix driving materials.

However, as this material is smaller ($\Delta\epsilon = \sim 0.6$) in dielectric anisotropy, the threshold voltage, $V_{90\%}0°$, becomes higher as is clear from Table 2'. Accordingly, in practical use, the material is required to be used in combination with compounds of a large positive value of $\Delta\epsilon$, which are called p-type compounds. The present inventors have examined the p-type compounds concerning their effects on the threshold voltage and electrooptical characteristics when they are used in combination with the pyrimidines. These compounds are collectively shown in Table 2.

TABLE 1'

| Composition 1' | |
|---|---|
| Component | Weight % |
|  | 16.6 |
|  | 16.6 |
|  | 16.6 |
|  | 16.6 |
|  | 16.6 |
|  | 16.6 |

TABLE 2'

| | Composition 1' | ZLI-1701 | E-90 | RO-TN-403 |
|---|---|---|---|---|
| $V_{90\%}^{0°}$ (V) | 6.80 | 1.78 | 1.32 | 1.43 |
| $a^{0°}$ | 1.39 | 1.42 | 1.39 | 1.42 |
| $a^{15°}$ | 1.20 | 1.33 | 1.28 | 1.28 |
| $a^{30°}$ | 1.14 | 1.27 | 1.23 | 1.21 |
| $a^{45°}$ | 1.11 | 1.24 | 1.20 | 1.18 |
| $\gamma_{45°,\ 90\%}^{15°,\ 50\%}$ | 1.18 | 1.33 | 1.36 | 1.40 |

Figures 2A, 2B:
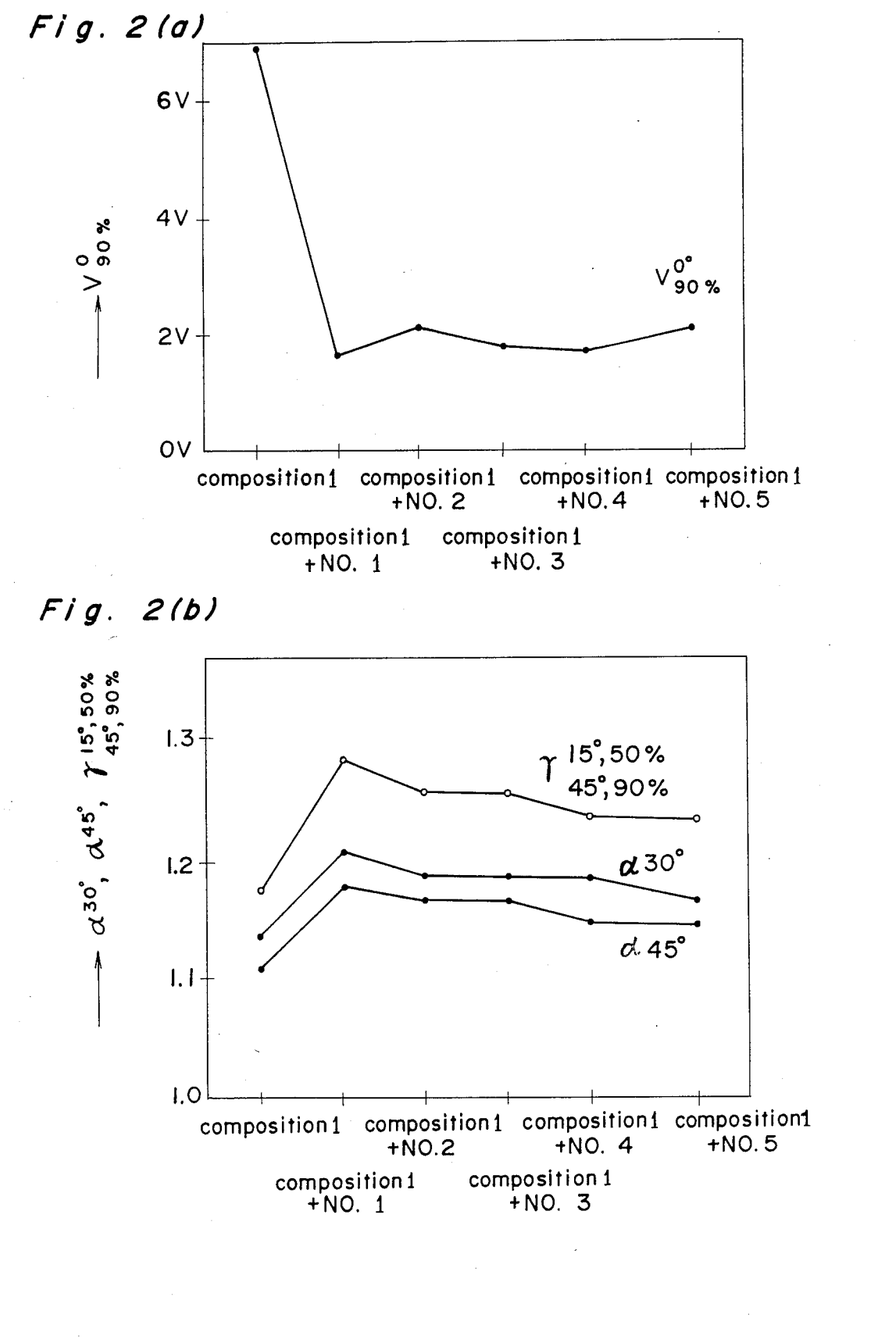
FIGS. 2(a) and 2(b) are graphs showing the addition effects of various compounds of positive dielectric anisotropy on electroopical characteristics such as $$V^{0°}_{90\%}(V),\, \alpha^\theta \text{ and } \gamma\,^{15°,\,50\%}_{45°,\,90\%}$$

The threshold voltage ($V_{90\%}0°$), contrast characteristics ($a^{30°}, a^{45°}$) and viewing-angle characteristics

$$\left( \gamma \begin{array}{l} 15°,\ 50\% \\ 45°,\ 90\% \end{array} \right)$$

of mixtures wherein these p-type compositions are added to the composition 1' at 20% by weight, respectively, show similar results as FIG. 2. That is to say, it can be found out that the threshold voltages are lowered to 3 V or lower due to the addition of the compositions, No. 1 through No. 5, and can be adjusted to prac- tical values. Also, the contrast characteristics ($\alpha^{30°}, \alpha^{45°}$) become better in the order of (bad): No. 1<No. 2≈No. 3≦No. 4≦No. 5 (good), and the viewing angle characteristics become better in the order of (bad): No. 1<No. 2≈No. 3<No. 4≈No. 5 (good). The further comparison between the No. 4 and No. 5 response and recovery times indicates that the No. 5 is superior to No. 4 in bringing about faster response and recovery by approximately 15%. It is apparent from the above-described results that the No. 5 is the most desirable. Also, according to similar examination on (n=1 through 7) and (n=1 through 7), which are compounds each having a cyanobiphenyl moiety, similar results as in the composition No. 5 are provided. In addition, it is confirmed that similar results are provided about the pyrimidine series compounds n=1 through 5, 7 through 12, m=1 through 5), which are different in number of carbon atoms from the composition 1'. As apparent from the examination results, the cyanobiphenyl series compounds are the most effective as a p-type component to be combined with the 2(4-alkoxyphenyl)-5-alkylpyrimidines.

As these mixtures are, however, as high as approximately 70 through 90 mm$^2$.s$^{-1}$ in viscosity at 20° C., they are inferior in response characteristics. They also have problems that undesirable smectic phases arise when the pyrimidine series compounds and the cyanobiphenyl series compounds are mixed to result in the narrowing of the nematic temperature range as a mixture. Therefore, these mixtures are not yet sufficient to meet the requirement as practical materials. To solve these problems, other substances to be added thereto are examined.

First, to have a wider nematic temperature range and a lower viscosity of composition, addition of low-viscosity material and high clearing-point material is required. The high clearing-point material is more desirable if the viscosity becomes lower. After the examination of the various compounds and mixed compounds from these points of view, the present inventors have found out through their experiences that the compositions, which have a nematic range from 0° C. through 60° C., and are 35 mm$^2$.s$^{-1}$ or lower in the viscosity at 20° C., can be provided through the various combinations of compounds satisfying the following two conditions as the low-viscosity materials, (1) molecular terminal groups are alkyl groups or alkoxy groups, and (2) viscosity ($\eta$) of 20° C. at temperature is 20 mm$^2$.s$^{-1}$ or lower, and of compounds satisfying the following four conditions as the high clearing-point materials,

(1) molecular terminal groups are alkyl groups or alkoxy groups, (2) the molecule has at least one cyclohexane ring or more therein,

(3) the molecule does not contain an ester linkage or does not contain two ester linkages or more if it does, and (4) the clearing point ($T_{cp}$) is approximately 100° C. or higher.

Concrete low-viscosity compounds are as follows.

($n_1, m_1$ = 1 through 6)

($n_2, m_2$ = 1 through 6)

($n_3, m_3$ = 1 through 6)

($n_4, m_4$ = 1 through 6)

($n_5, m_5$ = 1 through 6)

while the high melting-point materials are as follows.

($n_6, m_6$ = 1 through 10)

($n_7, m_7$ = 1 through 10)

($n_8, m_8$ = 1 through 10)

($n_9, m_9$ = 1 through 10)

-continued ($n_{10}, m_{10}$ = 1 through 10)

($n_{11}, m_{11}$ = 1 through 10)

($n_{12}, m_{12}$ = 1 through 10)

Second, the combination of the pyrimidine series compounds and cyanobiphenyl series compounds has a problem in that an undesirable induced smectic phase or a mixed condition of the smectic phase and the other phase, i.e., nematic phase or the like is likely to arise within the practical temperature range due to the mixture ratio of both compounds. After examination of the various substances, which prevent the formation of the smectic phase, the present inventors have found out that compounds having the structure of

($R_1 = C_nH_{2n+1}$, $R_2 = C_mH_{2m+1}$ n,m = 1 through 4) are extremely effective. For example, add, to the composition 1' as the pyrimidine series compounds, a liquid-crystal composition (hereinafter referred to as composition 2) wherein CN and

Figure 3:
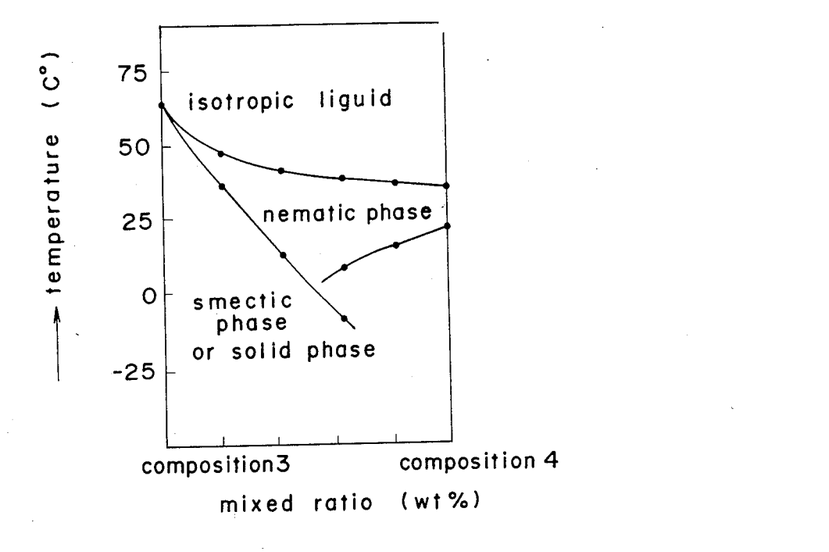
FIG. 3 is a phase diagram for the mixture system of the composition 3 and the composition 4.

CN are mixed at 1:1 by weight, and the smectic phase or a condition where the smectic phase and nematic phase are mixed with each other at room temperature within a range wherein the addition amount of the mixture of the latter is approximately 30% through 80% is formed. Add, to the mixture (hereinafter referred to as composition 3) of the composition 1' and the composition 2 mixed at 3:2 by weight, a mixture (hereinafter referred to as composition 4) wherein and are mixed at 1:1 by weight, and the inclination wherein the Tsn (the smectic phase-nematic phase transition temperature) lowers is considerable as shown in FIG. 3. Accordingly, the stable nematic phase is provided at room temperature. Also, similar effects are confirmed when wherein $R_1 = C_nH_{2n+1}$, $R_2 = C_mH_{2m+1}$, n, m = 1 through 7, is used. Such an effect is extremely considerable as compared with the other substances such as

Figure 4:
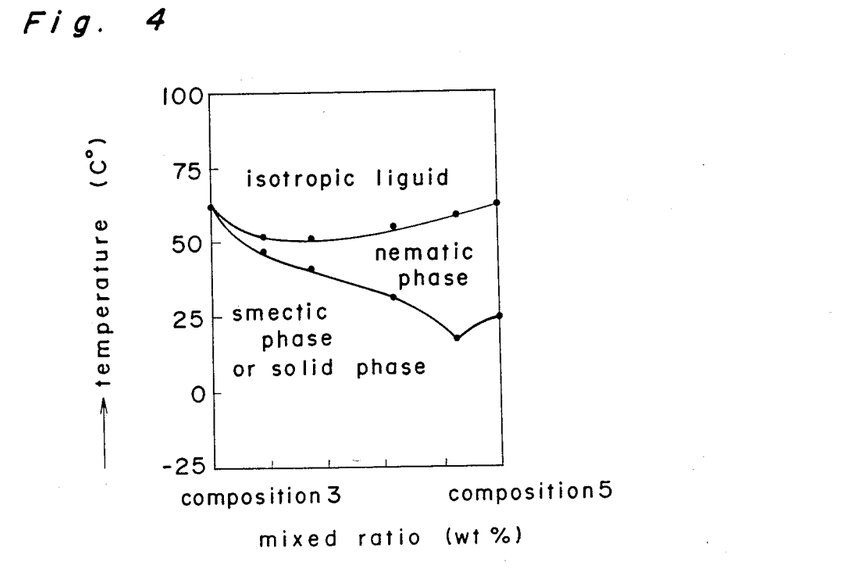
FIG. 4 is a phase diagram for the mixture system of the composition 3 and the composition 5.

($R_1 = C_nH_{2n+1}$, $R_2 = C_mH_{2m+1}$) and the like. FIG. 4 shows an example (hereinafter referred to as composition 5), for comparison, of a mixture of compounds wherein and have been mixed at 1:1 by weight.

As is apparent from the above-described results, it is found out that a compound, which has a structure of (n,m = 1 through 4) or (n,m=1 through 7), is better to be positively used when the undesirable smectic phase arising from the pyrimidine series compound and cyanobiphenyl series compound becomes a problem.

The compositions of the present invention provide mixed liquid-crystal materials which are sufficiently practical in threshold voltage and nematic temperature range, and are remarkably superior to the conventional materials in display characteristics. It is confirmed that the effects are caused when the pyrimidine series compounds and biphenyl series compounds in the mixed liquid-crystal material are respectively 3% or more by weight in content. The embodiments will be shown as follows.

EMBODIMENTS

An embodiment of the liquid crystal composition of the present invention which comprises basically the above mentioned components is shown in Table 3. Its electrooptical properties measured with the cell thickness of about 5.5 μm at room temperature are compiled in Table 4 as well as that of ZLI 1701 for comparison.

As is shown in Table 4, both the contrast and viewing angle characteristics ($\alpha$ values and $\gamma$ value) have been improved remarkably when compared with the counterparts of the commercial ZLI-1701. The value of the threshold voltage is low and both the response time and the delay time are short enough to be used practically.

TABLE 3

| No. | Components | wt. % |
|---|---|---|
| I |  | 5.0 |
|  |  | 5.0 |
| II |  | 11.7 |
|  |  | 9.0 |
| III |  | 13.5 |
|  |  | 13.5 |
| IV |  | 13.5 |
| V |  | 9.0 |
| VI |  | 13.5 |
| VII |  | 6.3 |

TABLE 4

| | Invention | Prior Art (ZLI-1701) |
|---|---|---|
| $V_{90\%}^{0°}$ | 2.60 V | 1.78 V |
| $\alpha^{0°}$ | 1.41 | 1.42 |
| $\alpha^{15°}$ | 1.27 | 1.33 |
| $\alpha^{30°}$ | 1.20 | 1.27 |
| $\alpha^{45°}$ | 1.16 | 1.24 |
| $\gamma_{45°,\ 90\%}^{15°,\ 50\%}$ | 1.23 | 1.33 |
| $\tau_r$* | 9.4 msec | 6.4 msec |
| $\tau_\alpha$** | 25 msec | 20 msec |

*$\tau_r$: response time when the applied voltage rises from 0 to $4 \times V_{90\%}^{0°}$.

**$\tau_\alpha$: delay time when the applied voltage $4 \times V_{90\%}^{0°}$ is taken off.

EMBODIMENT 1'

A liquid-crystal composition of the present embodiment will be shown in Table 4'.

Heating and mixing operations were effected until the composition became a transparent liquid under no-pressure at such composition ratio as shown in this table to produce a liquid-crystal composition. The liquid-crystal composition was a nematic over a temperature range from −10° C. to 77° C.

The liquid-crystal composition was sealed into a TN type cell which had beforehand been provided with the twist directional treatment. Measurement was performed in transmissive way through the TN-cell provided with polarizers on both of its sides at the location of crossed nicols. The thickness of the liquid-crystal layer was set at 5.4 μm.

The electrooptical characteristics of the liquid-crystal display device using the present embodiment are shown in Table 6 along with those of the conventional liquid-crystal composition of ZLI-1701 shown in Table 2' for comparison.

TABLE 4

| Compounds | Composition ratio (wt %) |
|---|---|
|  | 5.5 |
|  | 5.5 |
|  | 5.5 |
|  | 5.5 |
|  | 5.5 |
|  | 5.5 |
|  | 6.7 |
|  | 5.4 |
|  | 4.7 |

TABLE 4-continued

| Compounds | Composition ratio (wt %) |
|---|---|
| C₅H₁₁—(H)—(○)—(○)—CN | 4.7 |
| C₃H₇—(H)—(○)—C₂H₅ | 11.4 |
| C₃H₇—(H)—(○)—OC₂H₅ | 6.7 |
| C₃H₇—(H)—(○)—(○)—C₂H₅ | 1.3 |
| C₅H₁₁—(H)—(○)—(○F)—C₂H₅ | 10.0 |
| C₃H₇—(H)—(○)—(○)—(H)—C₃H₇ | 2.7 |
| C₅H₁₁—(H)—(○)—(○)—(H)—C₃H₇ | 4.0 |
| C₃H₇—(H)—(○)—COO—(○)—C₃H₇ | 5.4 |
| C₅H₁₁—(H)—(○)—COO—(○)—C₃H₇ | 4.0 |

EMBODIMENTS 2

A liquid-crystal composition of the present embodiment will be shown in Table 5.

Heating and mixing operations were effected until the composition became a transparent liquid under no-pressure at such a composition ratio as shown in this table to produce a liquid-crystal composition. The liquid-crystal composition was a nematic over a temperature range from −10° C. to 73° C.

The characteristics of the liquid-crystal display device using the present embodiment are shown in Table 6. The structure of the display element used here is the same as that described in the embodiment 1.

As apparent from Table 6, the liquid-crystal composition of the present embodiments 1, 2 are extremely improved in contrast ($\alpha$ value) and viewing angle ($\gamma$ value) characteristics as compared with the conventional one, and have no problems in their practical use even in threshold voltage and response and recovery times. Accordingly, the usefulness of the present invention in a liquid-crystal composition can be again confirmed. As described hereinabove, the present invention is not restricted to these embodiments.

As the liquid-crystal composition of the present invention is extremely superior in its display characteristics as described hereinabove, it can sufficiently meet the demands to increase the information content of various liquid-crystal display apparatuses of a multiplexing operation at a high-level multiplexing such as character display devices, graphic display devices and the like. The liquid-crystal composition is more pronounced in its usefulness than the validity thereof in half-tone display especially when it is used in a liquid-crystal television.

TABLE 5

| Compounds | Composition ratio (wt %) |
|---|---|
|  | 5.5 |
|  | 5.5 |
|  | 5.5 |
|  | 5.5 |
|  | 5.5 |
|  | 5.5 |
|  | 4.1 |
|  | 4.1 |
|  | 4.3 |
|  | 3.5 |
|  | 8.5 |
|  | 5.0 |
|  | 1.0 |

TABLE 5-continued

| Compounds | Composition ratio (wt %) |
|---|---|
|  C$_5$H$_{11}$—H—⟨⟩—⟨⟩—C$_2$H$_5$ (with F) | 7.5 |
|  C$_3$H$_7$—H—⟨⟩—⟨⟩—H—C$_3$H$_7$ | 2.5 |
|  C$_5$H$_{11}$—H—⟨⟩—⟨⟩—H—C$_3$H$_7$ | 2.5 |
|  C$_3$H$_7$—H—⟨⟩—COO—⟨⟩—C$_3$H$_7$ | 3.5 |
|  C$_5$H$_{11}$—H—⟨⟩—COO—⟨⟩—C$_3$H$_7$ | 3.5 |
|  C$_5$H$_{11}$—H—COO—⟨⟩—C$_5$H$_{11}$ | 8.5 |
|  C$_3$H$_7$—H—COO—⟨⟩—OC$_2$H$_5$ | 8.5 |

TABLE 6

| | Conventional Example (ZLI-1701) | Example 1 | Example 2 |
|---|---|---|---|
| $V^{0°}_{90\%}$ (V) | 1.78 | 2.41 | 2.64 |
| $\alpha^{0°}$ | 1.42 | 1.38 | 1.36 |
| $\alpha^{15°}$ | 1.33 | 1.24 | 1.23 |
| $\alpha^{30°}$ | 1.27 | 1.19 | 1.16 |
| $\alpha^{45°}$ | 1.24 | 1.16 | 1.14 |
| $\gamma^{15°, 50\%}_{45°, 90\%}$ | 1.33 | 1.25 | 1.23 |
| Tr* (ms) | 6.4 | 11 | 12 |
| Td** (ms) | 20 | 38 | 41 |
| $\eta$(mm$^2$ · s$^{-1}$) | 15 | 30 | 34 |

*Tr is a response time in a case where the voltage has been applied from 0 (V) to 4 × $V^{0°}_{90\%}$ (V).

**Td is a recovery time in a case where the voltage has been applied from 4 × $V^{0°}_{90\%}$ to 0 (V).

Although the present invention has been fully described by way of examples with reference to the accompanying drawings, it is to be noted that various changings and modifications will be apparent to those skilled in the art. Therefore, unless otherwise such changings and modifications depart from the scope of the present invention, they should be construed as included therein.

Further liquid-crystal compositions of the present invention will be shown in Tables 7 and 8. Some characteristics of these compositions are shown in Table 9. These compositions meet the demands to increase the information content of various liquid-crystal display devices and the like. These liquid-crystal compositions are more considerable in their usefulness than the validity thereof in half-tone display especially when they are used in a liquid-crystal television.

TABLE 7

| Compounds | Composition ratio (wt %) |
|---|---|
|  C$_7$H$_{15}$—⟨N=N⟩—⟨⟩—OCH$_3$ | 9,5 |

TABLE 7-continued

| Compounds | Composition ratio (wt %) |
|---|---|
| C$_7$H$_{15}$—[pyrazine]—[phenyl]—OC$_7$H$_{15}$ | 7,4 |
| C$_7$H$_{15}$—[pyrazine]—[phenyl]—OC$_9$H$_{19}$ | 5,3 |
| C$_9$H$_{19}$—[pyrazine]—[phenyl]—OCH$_3$ | 10,1 |
| C$_9$H$_{19}$—[pyrazine]—[phenyl]—OC$_6$H$_{13}$ | 11,7 |
| C$_9$H$_{19}$—[pyrazine]—[phenyl]—OC$_9$H$_{19}$ | 9,0 |
| C$_3$H$_7$—[cyclohexyl]—[phenyl]—OCH$_3$ | 23,0 |
| C$_2$H$_5$—[phenyl]—[phenyl]—CN | 7,0 |
| C$_3$H$_7$—[phenyl]—[phenyl]—CN | 3,0 |
| C$_5$H$_{11}$—[phenyl]—[phenyl]—[phenyl]—CN | 5,0 |
| C$_3$H$_7$—[cyclohexyl]—[phenyl]—[phenyl]—[cyclohexyl]—C$_3$H$_7$ | 4,0 |
| C$_3$H$_7$—[cyclohexyl]—[phenyl]—[phenyl]—[cyclohexyl]—C$_5$H$_{11}$ | 5,0 |

TABLE 8

| Compounds | Composition ratio (wt %) |
|---|---|
| C$_7$H$_{15}$—[pyrazine]—[phenyl]—OCH$_3$ | 8,8 |

TABLE 8-continued

| Compounds | Composition ratio (wt %) |
|---|---|
|  | 6,9 |
|  | 4,9 |
|  | 9,3 |
|  | 10,8 |
|  | 8,3 |
|  | 23,0 |
|  | 8,0 |
|  | 6,0 |
|  | 6,0 |
|  | 3,0 |
|  | 5,0 |

TABLE 9

| Composition of Table | Nematic Temp. Range | $\eta$ (mm$^2$·s$^{-1}$) |
|---|---|---|
| 7 | −13° C. to 64° C. | 43 |
| 8 | −14° C. to 63° C. | 42 |

The invention may be embodied in other specific forms without departing from the spirit or essential characteristics thereof. The present embodiment is therefore to be considered in all respects as illustrative and not limitative, the scope of the invention being indicated by the appended claims rather than by the foregoing description, and all changes which come within the meaning and range of equivalency of the claims are therefore intended to be embraced therein.

Liquid crystal compositions according to the present invention are superior in display characteristics as described above in detail. Thus, they can be adapted well to the increase in the display capacity of devices such as display devices and graphic display devices. Especially, they can be applied to liquid crystal televisions where the effectiveness of a half-tone display can be fully exploited.

What is claimed is:

1. In a liquid crystal display device of the matrix display type having a high contrast ratio and a broad effective viewing-angle range, which contains a liquid crystal composition having a positive dielectric anisotropy in the nematic phase, said composition comprising 3 wt.% or more of 2-(4-alkoxyphenyl)-5-alkylpyrimidine compounds and a p-type component comprising cyanobiphenyl compounds selected from the group consisting of a 4-alkyl-4'-cyanobiphenyl, a 4-alkoxy-4'-cyanobiphenyl, a 4-alkoxy-ethyleneoxy-4'-cyanobiphenyl, and a 4-cyano-4'-(4-alkyl)-cyclohexylbiphenyl, the improvement comprising said composition further including a low-viscosity material having a viscosity ($\eta$) at 20° of 20 mm$^2$.s$^{-1}$ or lower and a high clearing-point material having a clearing point ($T_{cp}$) of 100° C. or higher, each of said materials being present in an effective amount so that the clearing point of the composition is 60° C. or higher and the viscosity at 20° C. is 35 mm$^2$.s$^{-1}$ or lower.

2. The liquid crystal display device of claim 1, wherein said composition further comprises a component which prevents the formation of smectic phase at least in the range from 0° C. through 60° C.

3. The liquid crystal display device of claim 1 wherein said p-type component consists essentially of cyanobiphenyl compounds.

4. The liquid crystal display device of claim 1, wherein said 2-(4-alkoxyphenyl)-5-alkylpyrimidine compound is represented as wherein $R_1 = C_n H_{2n+1}$ (n=1~12) and $R_2 = C_n H_{2n+1}$ (n=1~12).

5. The liquid crystal display device of claim 1, wherein said low-viscosity material consists of compounds having alkyl or alkoxy groups as molecular terminal groups.

6. The liquid crystal display device of claim 1, wherein said low-viscosity material is a member selected from the group consisting of compounds represented by the following general formulae:

Component (I)

Component (II)

Component (III)

Component (IV)

Component (V)

wherein $R_1$ through $R_8$ represent a straight-chain alkyl group having 1 through 6 carbon atoms, and $R_3'$ and $R_6'$ represent straight-chain alkoxy groups having 1 through 6 carbon atoms.

7. The liquid crystal display device of claim 1, wherein said high clearing-point material is a member selected from the group consisting of compounds having alkyl or alkoxy groups as molecular terminal groups.

8. The liquid crystal displace device of claim 7, wherein said high clearing-point material is a member selected from the group consisting of compounds having at least one cyclohexane ring or more in the molecule.

9. The liquid crystal display device of claim 7, wherein said high clearing-point material is a member selected from compounds which do not contain two ester linkages or more in the molecule.

10. The liquid display device of claim 9, wherein said high clearing-point material is a member selected from the group consisting of compounds which do not contain ester linkages in the molecule.

11. The liquid crystal display device of claim 1, wherein said high clearing-point material is a member selected from the group consisting of compounds represented by the following general formulae:

Component (VI)

Component (VII)

Component (VIII)

Component (IX)

Component (X)

-continued

Component (XI)

Component (XII)

wherein $R_9$ through $R_{22}$ represent a straight-chain alkyl group having 1 to 10 carbon atoms.

12. The liquid crystal display device of claim 1, wherein said composition comprises at least 33 wt. % of said 2-(4-alkoxyphenyl)-5-alkylpyrimidine compounds.

13. The liquid crystal display device of claim 2, wherein said component which prevents the formation of a smectic phase is a member selected from the group consisting of compounds represented by the following general formulae:

(n, m = 1 through 4)

(n, m = 1 through 7).

14. The liquid crystal display device of claim 13, wherein said component which prevents the formation of a smectic phase is present in an amount of at least 12.5%.

15. The liquid crystal display device of claim 1, wherein said composition comprises 16 to 21.5 wt.% of said cyanobiphenyl compounds.

16. A liquid crystal composition having a positive dielectric anisotropy in the nematic phase, a p-type component consisting essentially of cyanobiphenyl compounds sselected from the group consisting of a 4-alkyl-4'-cyanobiphenyl, a 4-alkoxy-4'-cyanobiphenyl, a 4-alkoxy-ethyleneoxy-4'-cyanobiphenyl, and a 4-cyano-4'(4-alkyl)-cyclohexyl biphenyl, comprising 3 wt.% or more of a 2-(4-alkoxyphenyl)-4-alkylpyrimidine compound, a low-viscosity material having a viscosity ($\eta$) at 20° C. of 20 mm$^2$.s$^{-1}$ or lower and a high clearing-point material having a clearing point ($T_{cp}$) of 100° C. or higher.

17. A liquid crystal composition according to claim 16, wherein said low-viscosity material is a member selected from the group consisting of compounds represented by the following general formulae:

Component (I)

Component (II)

Component (III)

Component (IV)

Component (V)

wherein $R_1$ through $R_8$ represent a straight-chain alkyl group having 1 through 6 carbon atoms, and $R_3'$ and $R_6'$ represent straight-chain alkoxy groups having 1 through 6 carbon atoms, and said high clearing point material is a member selected from the group consisting of compounds represented by the following general formulae:

Component (VI)

Component (VII)

Component (VIII)

Component (IX)

Component (X)

Component (XI)

Component (XII)

wherein $R_9$ through $R_{22}$ represent a straight-chain alkyl group having 1 through 10 carbon atoms.

18. In a liquid crystal television device comprising a liquid crystal composition, the improvement wherein the liquid crystal composition is that of claim 16.

19. The liquid crystal display device of claim 1, wherein the alkyl portion of said 4-alkyl-4'-cyanobiphenyl has 1 to 9 carbons, the alkoxy portion of said 4-alkoxy-4'-cyanobiphenyl has 1 to 7 carbons, the alkoxy portion of said 4-alkoxy-ethyleneoxy-4'-cyanobiphenyl has 1 to 5 carbons and the (4-alkyl) portion of said 4-cyano-4'(4-alkyl)-cyclohexyl-biphenyl has 1 to 7 carbons.

20. A liquid crystal composition according to claim 16, wherein the alkyl portion of said 4-alkyl-4'-cyanobiphenyl has 1 to 9 carbons, the alkoxy portion of said 4-alkoxy-4'-cyanobiphenyl has 1 to 7 carbons, the alkoxy portion of said 4-alkoxy-ethyleneoxy-4'-cyanobiphenyl has 1 to 5 carbons and the (4-alkyl) portion of said 4-cyano-4'(4-alkyl)-cyclohexyl-biphenyl has 1 to 7 carbons.

* * * * *